Aug. 12, 1947.        D. M. BLAKELY        2,425,507
METHOD OF MANUFACTURING BOATS
Filed Feb. 28, 1946

INVENTOR
DUDLEY M. BLAKELY
BY *Everett H. Wright*
ATTORNEY

Patented Aug. 12, 1947

2,425,507

UNITED STATES PATENT OFFICE 2,425,507

METHOD OF MANUFACTURING BOATS

Dudley M. Blakely, Bloomfield Hills, Mich.

Application February 28, 1946, Serial No. 650,810

2 Claims. (Cl. 9—6.5)

This invention relates to an improved and more economical method of manufacturing boats of various lengths and beams.

In the prior art, boat hulls manufactured in production have been formed in various manners and of various materials over a mold or have been molded of plywood or plastic over a mold by applying to the mold plywood or thermal setting plastic in substantially flat pieces, enveloping the mold so covered with a rubberized or other air impervious covering, applying heat or steam within the said covering to make the plywood or plastic pliable, creating a vacuum within said covering whereby to uniformly press the said plywood or plastic to the mold, allowing the plywood or plastic to cool and set, and then removing the said covering. The boat hull so formed is then fitted to a keel, ribs and transom, properly sealed or caulked, painted or otherwise finished, and then launched.

The prior art methods require a mold for each different size of boat, which requirement makes it extremely expensive for boat manufacturers to construct boats of a wide range of lengths and beams.

The primary object of this invention is to provide a method of molding or otherwise forming the hulls of boats over a mold wherein a single mold may be employed for the purpose of molding or otherwise forming a plurality of boat hulls of a wide range of lengths and beams.

Other objects of the invention will become apparent by reference to the following detailed description taken in connection with the accompanying drawing, in which.

Figure 1:
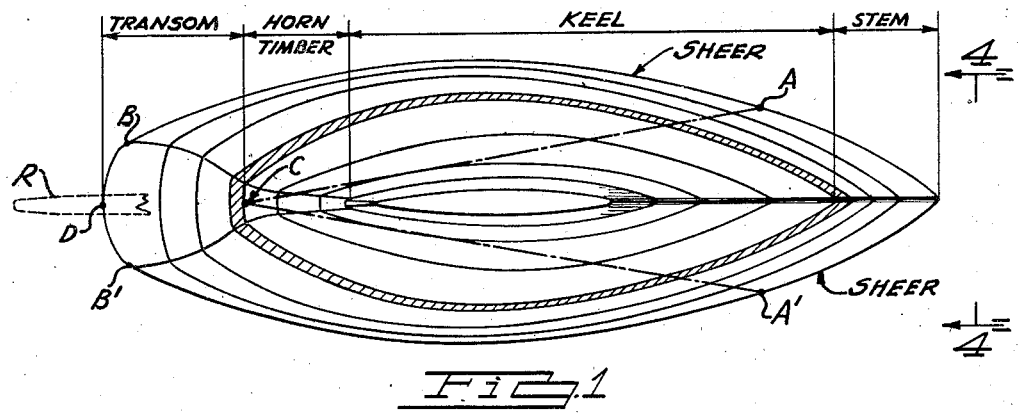
Fig. 1 is a more or less diagrammatic top view of a mold of the hull of a sailboat, a fragment of the rudder being indicated in dotted lines.
Figure 2:
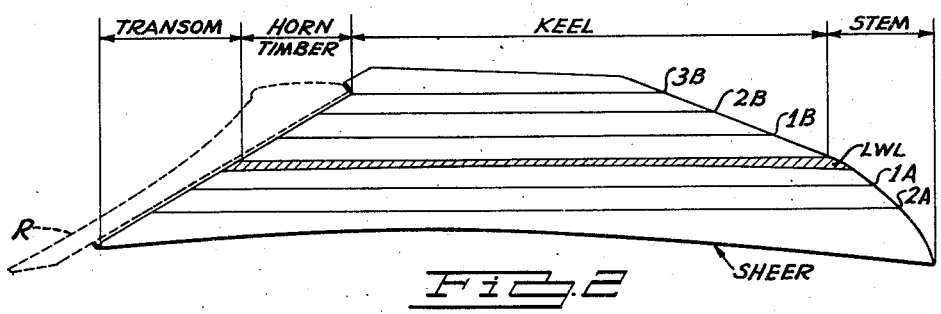
Fig. 2 is a side elevational view of the mold shown in Fig. 1.
Figure 4:
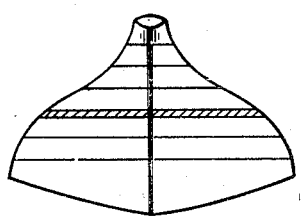
Fig. 4 is a more or less diagrammatic view taken on the line 4—4 of Fig. 1.
Figure 5:
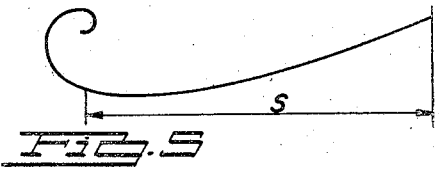
Fig. 5 is a view of a spiral curve of the type preferably employed for the basic mold line configuration.

For the purpose of illustrating the invention, the mold shown in Figs. 1, 2 and 4 is that of a hull of a sailboat, say for example 30 feet long. On the said hull mold are indicated the load water line, top side mold lines 1A and 2A, under water mold lines 1B, 2B and 3B, the stem, keel, horn timber, transom and sheer. The rudder is indicated by the dotted lines R inasmuch as it does not enter into consideration in respect of the instant invention. In the particular hull mold indicated for the purpose of illustrating the invention the L. W. L., top side mold lines 1A and 2A, and the under water mold lines 1B, 2B and 3B preferably conform generally to the long end S of a spiral curve of the type indicated in Fig. 5.

A 30 foot hull formed or otherwise molded over the hull disclosed in Figs. 1, 2 and 4 is preferably molded into two half sections, one on each side of the longitudinal center line of the mold, the sections are removed from the mold and assembled onto the usual keel and ribs, and a suitable transom is formed at the stern to which the rear ends of the molded hull are joined, all in any suitable manner known in the boat building art.

Figure 3:
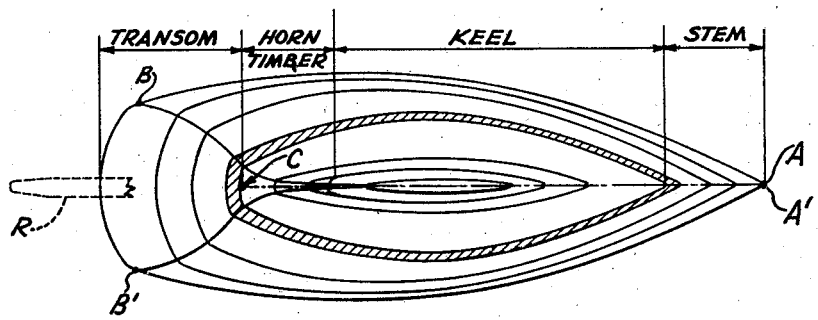
Fig. 3 is a more or less diagrammatic bottom view of the hull of a sailboat considerably shorter and proportionately narrower than the mold shown in Figs. 1 and 2 manufactured in accordance with the present invention over the mold disclosed in Figs. 1 and 2.

This invention is directed to the manufacture of hulls of various lengths and beams from a single mold such as disclosed in Figs. 1, 2 and 4. To accomplish the foregoing, and, for example, to manufacture a 22 foot hull, converging buttock lines A—C and A'—C are established with the points A and A' at a 22 foot radius from a point D which is established at the intersection of the keel line extended to the sternmost point of the transom, the point C being located at the forward end of the transom on the said keel line extended. Two half hull sections A—B—C and A'B'C are then molded over that portion of the 30 foot mold, the said half sections are then removed from the mold and assembled onto the usual keel and ribs with the points A—A' together, and a suitable transom is formed at the stern to which the rear end of the molded hull halves are joined, all in any suitable manner known in the boat building art which results in a 22 foot boat as indicated in Fig. 3. By establishing points A—A' on the 30 foot mold indicated in Fig. 1 at other distances from the point D, any length of hull from 10 to 30 feet may be molded thereover.

To obtain a finished boat of proportionately narrower beam, the point C which is normally established at the forward end of the transom on the keel line extended of the 30 foot or master mold, is moved toward the stern along the transom on the keel line extended.

Thus, with a single master hull mold, boat hulls of any length greater than one-third of the length of the master hull mold may be manufactured at no additional mold expense. Obviously, any known means for molding or forming hulls may be employed when practicing the instant invention, all according to the materials selected from which to mold a hull, and any hull construction known to the art of boat building may be employed.

Although but a single example of the method of molding hulls embodying the invention has been disclosed and described in detail, it is obvious that many variations of the illustrative method may be employed without departing from the spirit of the invention as defined by the appended claims.

I claim:

1. The method of manufacturing boats of various sizes from a single hull mold comprising the construction of a hull mold of the longest length and desired beam for that length, establishing diverging buttock lines from a point established at the intersection of the keel line extended to the sternmost point of the transom to sheer points located at a radius equal to the length of the hull to be molded from the said intersection of the keel line extended with the sternmost point of the transom, molding a fragmentary hull in two halves outside said diverging buttock lines, assembling said hull sections so molded onto a keel and ribs in the usual manner with the buttock lines thereof adjacent said keel, and forming a suitable transom at the stern to which the rear end of the molded and assembled hull sections are joined.

2. The method claimed in claim 1 except that the point on the keel line extended selected for the point from which the buttock lines diverge is located rearward of the forward end of the transom whereby to cause the finished hull to have a narrower beam than otherwise.

DUDLEY M. BLAKELY.